3,577,541
COMPOSITIONS AND METHODS FOR EFFECTING
TRANQUILITY WITH TRIAZINES
John Thomas Shaw, Middlesex, N.J., assignor to
American Cyanamid Company, Stamford, Conn.
No Drawing. Continuation-in-part of application Ser. No.
240,745, Nov. 28, 1962, now Patent No. 3,505,322,
dated Apr. 5, 1970. This application July 23, 1963,
Ser. No. 296,915
Int. Cl. A61k 27/00
U.S. Cl. 424—249                                5 Claims

ABSTRACT OF THE DISCLOSURE (N-monooxyamino)-s-triazines for effecting tranquilization.

This application is a continuation-in-part of Ser. No. 240,745, filed Nov. 28, 1962, now U.S. Pat. No. 3,505,322, issued Apr. 5, 1970.

This invention relates to, and has for its object, the provision of (N-monooxyamino)-s-triazines having one of the Formulae I–V:

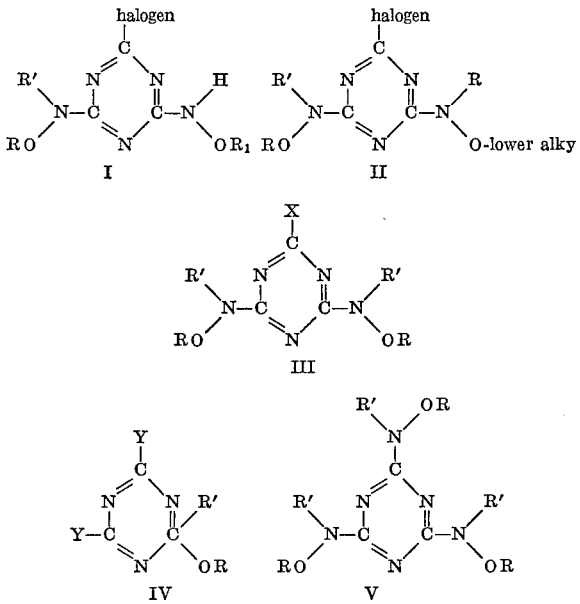

wherein X is either hydrogen, lower alkyl, halogenated lower alkyl (such as chlorinated lower alkyl and fluorinated lower alkyl groups, e.g., perfluoro and perchloromethyl, dichloromethyl, α,α-dichloroethyl and chloromethyl groups), phenyl lower alkyl, lower alkoxy, lower alkenyloxy, lower alkylmercapto, phenyl, lower alkoxyalkoxy, lower alkoxyalkyl, mercapto, hydroxy, phenoxy, phenylthio,

piperidino, lower alkylpiperidino, pyrrolidino, lower alkylpyrrolidino, tetrahydrooxazino, lower alkyltetrahydrooxazino, piperazino or 4-R-pierazino; each Y is either X or halogen; $R_1$ radical is either alkyl of 2–7 carbons, cycloalkyl of 3–7 carbons, hydroxy lower alkyl, lower alkoxy lower alkyl, phenyl, phenyl lower alkyl, lower alkenyl or propargyl; each R radical is individually either $R_1$ or methyl; and each R' radical is either hydrogen or R. When phenyl groups are present in triazine compounds of the above formulae, they may be substituted by halogen, lower alkoxy, lower alkyl or halogenated lower alkyl radicals (preferably no more than three). Likewise, the invention also contemplates pharmaceutically acceptable salts of triazines of Formulae I–V, for example with organic or inorganic acids such as HCl, $HNO_3$, $H_2SO_4$, $H_3PO_4$, acetic, maleic, citric, and the like, or the salts with alkali metal or alkaline earth metal bases (e.g., sodium, potassium, calcium and barium hydroxides or carbonates).

The compounds of Formulae I–V can be prepared by reacting a halo-s-triazine with an oxyamine in a suitable solvent and in the presence of an alkaline material. As used in the present disclosure, the term "oxyamine" is intended to mean an amine having either an hydroxyl, a "$R_1O$," a "lower alkyl-O—" or a "RO" group wherein R and $R_1$ are as above-defined, bonded directly to the nitrogen atom. When an oxyamine other than hydroxylamine is reacted with the halo-s-triazine, compounds of the foregoing formulae are obtained directly upon replacement of one or both halo groups. Alternatively, when the halo radical (or radicals) have been replaced by an hydroxyamino radical (or radicals), the resulting hydroxyaminotriazine may be converted to a compound of Formulae I–V by treatment with the reagent capable of etherifying an hydroxy group, e.g., RBr, RI (or any other ester of the class of alcohols, "$R_1OH$" or "lower alkyl-OH" or "ROH" and an acid such as HBr, $H_2SO_4$ or p-toluene sulfonic).

The halo-h-triazines which may be used include cyanuric chloride,
2-chloro-4,6-diamino-s-triazine,
2,4-dichloro-6-diethylamino-s-triazine,
2,4-dichloro-6-methoxy-s-triazine,
2,4-bis(methoxyamino)-6-chloro-s-triazine,
2-anilino-4,6-dichloro-s-triazine,
2-(N-methylanilino)-4,6-dichloro-s-triazine,
2-amino-4,6-dichloro-s-triazine,
2-chloro-4,6-bis(diethylamino)-s-triazine,
2-butylamino-4,6-dichloro-s-triazine,
2-dibutylamino-4,6-dichloro-s-triazine,
2-anilino-4-chloro-6-diethylamino-s-triazine,
2-methyl-4-benzyl-6-chlorotriazine,
2-methoxy-4-phenyl-6-chlorotriazine,
2-ethoxymethoxy-4-ethoxymethyl-6-bromotriazine,
2-methylmercapto-4-phenethyl-6-chlorotriazine,
2-hydroxy-4-phenylthio-6-chlorotriazine,
2-pyrrolidino-4,6-dichlorotriazine,
2-piperazino-4-diethylamino-6-chlorotriazine,
2-morpholino-4-methylamino-6-chlorotriazine and
2-(4-methylpiperazino)-4-methoxy-6-chlorotriazine.

The oxyamines include hydroxylamine and its N-substituted derivatives, such as N-methylhydroxylamine, N-ethylhydroxylamine; alkoxyamines such as methoxyamine, ethoxyamine, cyclopropoxyamine, butoxyamine, cyclohexoxyamine, allyloxyamine, propargyloxyamine; aralkoxyamines such as benzyloxyamine and hydroxyamines such as hydroxyethoxyamine.

In the reaction of a halo-s-triazine with an oxyamine, it is necessary that at least one halogen of the halo-s-triazine be replaced by an oxyamino group. At the same time, one or more additional halogens of the halo-s-triazine may also be replaced. The following procedures of carrying out the reaction are given as examples of the possible methods.

In the case where all halogens on the triazine ring are to be replaced, a preferred method is to add the halo-s-triazine to a cold aqueous solution (at about 0–5° C.) of an excess (e.g., about 2 moles or more per atom of replaceable halogen) of an alkoxyamine and then gradually heat the reaction mixture to effect the reaction. It is advantageous to dissolve the alkoxyamine as the hydrochloride, or other salt, in water and to add an equimolar amount of alkali, such as sodium hydroxide, to liberate the free oxyamine. A solution of the halo-s-triazine in a suitable inert organic solvent such as an oxygenated solvent, e.g., dioxane, 1,2-dimethoxyethane, dimethyl ether of diethyleneglycol, is then added to the aqueous solution of oxyamine. Where the amount of oxyamine used is not sufficient to replace all the halogens of the triazine starting material, the resulting product can be a halo-alkoxyamino-s-triazine. The latter can be used as such or further reacted with an amine (e.g., ethylamine, ethanolamine, cyclopropylamine, cyclohexylamine, trimethoxyaniline, etc.), a phenol (e.g., phenol or cresol) or a mercaptan (e.g., phenylmercaptan) under alkaline conditions to effect a further replacement of the remaining halogen groups in the triazine ring. The extent of replacement will, of course, depend on the molar ratio of the s-triazine to the amine, phenol or mercaptan and experimental conditions such as the temperatture.

The replacement reaction may be variously modified and yet be within the framework of the foregoing principles. Possible modifications include (1) the addition of aqueous alkali (e.g., sodium hydroxide) to a mixture of the halo-s-triazine and oxyamine hydrochloride in an ether, or other inert solvent, (2) the reaction of a halo-s-triazine and an oxyamine in alkanolic solution, (3) the addition of a solution of the oxyamine in dioxane to a slurry of the halo-s-triazine in water, followed by the addition of an aqueous alkali, (4) the addition of small amounts of water to a mixture of a halo-s-triazine, oxyamine salt and an alkali water-ether medium. Likewise, instead of reacting a halotriazine to replace the halo groups, mercaptotriazines may be employed, and in this case, the mercapto group will be replaced.

The compounds of this invention are, generally, crystalline solids. They are usually insoluble to slightly soluble in aqueous solutions, but generally soluble in acohols and acetone. They are amphoteric compounds; they dissolve in dilute acids and alkali.

The compounds of this invention are chelating agents for heavy metals, particularly iron. They are thus useful as sequestering agents or as deactivators for the prevention of oxidative deterioration of vegetable and mineral oils due to "heavy metal catalyzed" oxidation reactions.

The compounds of this invention are also useful pharmaceuticals. It has in fact been discovered that a class of compounds inclusive of those of Formula I–V, possesses desirable pharmacological properties and, in particular, the members are central nervous system depressants of the tranquilizer-muscle relaxant type. This type of activity can be demonstrated and measured by the methods described by Kinnard et al., Jour. Pharm. and Exp. Therapeutics, vol. 121, p. 354 (1957), and Randall, Diseases of the Nervous System, vol. 21 (March supp.), p. 7 (1960). In addition, these compounds have other pharmaceutical properties such as diuretic and hypotensive activity. Generally speaking, the compounds which function in this manner may be characterized as (N-monooxyamino)-s-triazines of the Formula VI:

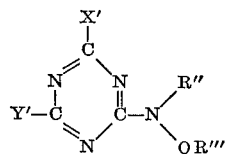

VI wherein X' and Y' are individually either hydrogen, lower alkyl, halogenated lower alkyl (such as chlorinated lower alkyl and fluorinated lower alkyl groups, e.g., perfluoro and perchloromethyl, dichloromethyl, α,α-dichloroethyl and chloromethyl groups), phenyl lower alkyl, lower alkoxy, lower alkenyloxy, lower alkyl mercapto, phenyl, lower alkoxyalkoxy, lower alkoxyalkyl, halogen, mercapto, hydroxy, phenoxy, phenylthio,

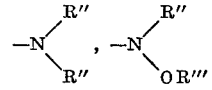

piperidino, lower alkyl piperidino, pyrrolidino, lower alkyl pyrrolidino, tetrahydrooxazino, lower alkyltetrahydrooxazino, piperazino or 4-R'''-piperazino; each R''' radical is individually either a lower alkyl, cycloalkyl of 3 to 7 carbons, hydroxy lower alkyl, lower alkoxy lower akyl, phenyl, phenyl lower alkyl, lower alkenyl or propargyl group; and each R'' radical is individually either hydrogen or R'''. When phenyl groups are present in triazine compounds of Formula VI, they may be substituted by halogen, lower alkoxy, lower alkyl or halogenated lower alkyl radicals (preferably no more than three). Likewise, the invention also contemplates pharmaceutically acceptable salts of compounds of Formula VI, for example with acids such as HCl, $HNO_3$, $H_2SO_4$, $H_3PO_4$ and the like, or the salts with alkali metal or alkaline earth metal bases (e.g., sodium, potassium, calcium and barium hydroxides or carbonates).

Compounds of Formula VI may be expected to produce a tranquilizing effect without noticeable toxic side effects at individual doses between about 10 milligrams and 250 milligrams. The dosage regimen may be adjusted to provide the optimum therapeutic response. For example, several doses may be administered daily, or the dose may be proportionately reduced as indicated by the exigencies of the therapeutic situation.

For therapeutic administration, these compounds may be admixed with pharmaceutical excipients and used, for instance, in the form of tablets, dragees, capsules, suppositories, injectable liquids, liquids to be administered in drops, emulsions, suspensions, syrups, chocolate, candy, chewing gum, and the like. Such compositions and preparations should contain at least 0.1% of the active ingredient. The percentage in the compositions and preparations may, of course, be varied and may conveniently be between about 2% and about 60% or more of the weight of the unit. The amount of active ingredient in such therapeutically useful compositions or preparations is such that a suitable dosage will be obtained. Preferred compositions or preparations according to the present invention may be prepared in such a manner that a dosage unit form contains between about 10 milligrams and about 250 milligrams of the novel compounds.

Especially useful for pharmaceutical purposes in the manner described above, are those triazines of Formulae III and V having various combinations of lower alkoxyamino, lower alkylamino, lower alkoxy, lower alkenyloxy and hetero radicals, each triazine having at least one O-substituted oxyamino radical. The class of Formula VI embraces the especially useful class distinguished by a 1,3,5-triazine nucleus having three amino substituents, at least one of which has an ether oxygen bonded thereto. Preferred examples of these triazines are:

(1) 2,4,6-tris-lower alkoxyamino-s-triazines,
(2) 2,4-bis-lower alkoxyamino-6-lower alkylamino-s-triazines,
(3) 2,4-bis-lower alkoxyamino-6-lower cycloalkylamino-s-triazines,
(4) 2,4-bis-lower alkoxyamino-6-tetrahydrooxazino-s-triazines,
(5) 2,4-bis-lower alkoxyamino-6-lower alkoxy-s-triazines,
(6) 2,4-bis-lower alkoxyamino-6-pyrrolidino-s-triazines,
(7) 2,4-bis-lower alkoxyamino-6-piperidino-s-triazines,
(8) 2,4-bis-lower alkoxyamino-6-(4-lower alkyl-1-piperazino)-s-triazines, and (9) 2,4-bis-lower alkoxyamino-6-lower alkenyloxy-s-triazines.

The following examples are presented to further illustrate the present invention. Parts and percentages are expressed on a weight basis.

EXAMPLE 1

2,4,6-tris(methoxyamino)-s-triazine

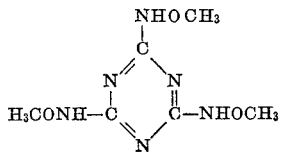

A solution of 167 parts (2.4 moles) of hydroxylamine hydrochloride in 200 parts of water is cooled to −10° C., and the solution is neutralized by the dropwise addition of a solution of 96.0 parts (2.4 moles) of sodium hydroxide in 200 parts of water, while keeping the temperature at about −10° C. To this solution at about −10° C. there is added dropwise over a period of 0.5 hour, a solution of 36.9 parts (0.2 mole) of cyanuric chloride in 100 parts of dioxane. The resulting reaction mixture is stirred at about 2° C. for one hour, at about 55° C. for two hours, and finally at reflux temperature (about 91° C.) for one hour. The violet-colored solution of pH 6.0 is cooled to 0° C., the precipitate is separated by filtration, dissolved in caustic methanol containing sodium methoxide and alkylated with methyl bromide to give the product.

The corresponding hydrochloride is readily prepared by treatment of the above product with anhydrous HCl.

EXAMPLE 2

2,4-diamino-6-ethoxyamino-s-triazine

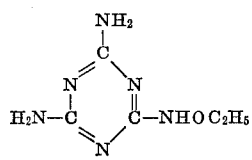

To a solution of 55.6 parts (0.8 mole) of hydroxylamine hydrochloride and 200 parts of water which has been neutralized by the dropwise addition of a solution of 32.0 parts (0.8 mole) of sodium hydroxide in 200 parts of water, there is added 29.1 parts (0.2 mole) of 2-chloro-4,6-diamino-s-triazine at about −5° C. After the reaction mixture is heated at about 55° C. for three hours and then at about 102° C. for one hour, it is filtered hot and the filtrate is allowed to cool. The resulting precipitate is separated by filtration, washed with distilled water, air dried and is purified by crystallization from water. It is converted to the final product by alkylation with ethyl bromide in ethanol and sodium ethoxide.

EXAMPLE 3

2-chloro-4-hydroxy-6-benzyloxyamino-s-triazine

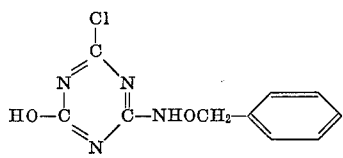

To a solution of 18.4 parts (0.1 mole) of cyanuric chloride in 210 parts of ether at 0° C., there is added 0.1 mole of benzyloxyamine hydrochloride and then dropwise, at about 0° C., over a two-hour period, a solution of 8.0 parts (0.2 mole) of sodium hydroxide in 50 parts of water. After stirring at about 3° C. for 1.5 hours, the ether portion of the reaction mixture is evaporated at room temperature, and the residue is dried in vacuo over $P_2O_5$ to give the product. The corresponding acetic acid salt is obtained by refluxing the product in glacial acetic acid.

EXAMPLE 4

2,4-dimethoxy-6-methoxyamino-s-triazine

A mixture of 0.2 mole of methoxyamine, 0.1 mole of 2-chloro-4,6-dimethoxy-s-triazine and 90 ml. of $H_2O$ is heated to 50° C., and then $Na_2O_3$ is added at such a rate as to keep the mixture slightly alkaline while heating gradually to 80° C. (a total of 0.5 mole of sodium carbonate is used). The mixture is heated at 75–80° C. for an additional 20 minutes, cooled and filtered. There is obtained 10.3 g. of the desired material, M.P. 133–135, after recrystallization from acetone.

EXAMPLE 5

2,4-dimorpholino-6-(N-methyl-N-allyloxyamino)-s-triazine

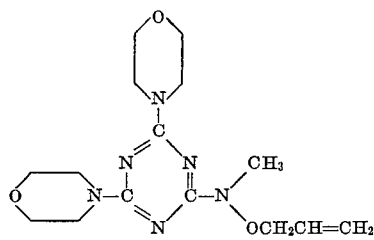

A solution of 18.4 parts (0.1 mole) of cyanuric chloride in 50 parts of dioxane is added at about 5° C. to 60 parts of ice water. To the resulting slurry, there is added dropwise, a solution of 0.1 mole of N-methyl-N-allyloxyamine in 25 parts of dioxane at about 0° C. followed by a solution of 5.3 parts (0.05 mole) of sodium carbonate in 15 parts of water. After stirring for one hour at about 3° C., the reaction mixture is treated dropwise with 0.2 mole of morpholine at about 30° C. and then aqueous $Na_2O_3$. The mixture is then stirred at about 70° C. for one hour, and the solid recovered and dried to give the product.

EXAMPLE 6

2-diethylamino-4,6-bis-(phenethoxyamino)-s-triazine

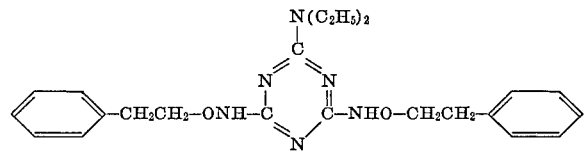

To a solution of phenethoxyamine hydrochloride (0.4 mole) in 35 parts of water neutralized at a temperature below 23° C. with a solution of 15.6 parts (0.39 mole) of sodium hydroxide in 35 parts of water, is added dropwise at about 5° C., 11.05 parts (0.05 mole) of 4,6-dichloro-2-diethylamino-s-triazine dissolved in 50 parts of dioxane. The reaction mixture is heated for one hour at about 60° C., refluxed (90° C.) for two hours, cooled and filtered. The product is recrystallized from aqueous methanol.

EXAMPLE 7

2-methylamino-4-chloro-6-(N-benzyl-N-cyclopropoxyamino)-s-triazine

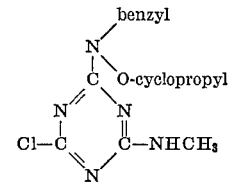

To a solution of 0.11 mole of N-benzyl-N-cyclopropoxyamine hydrochloride in 60 parts of methanol, is added a solution of 2.3 parts (0.1 mole) of sodium in 40 parts of methanol at a temperature of about 15° C. After removing the precipitate from this reaction mixture, 0.05 mole of 2-methylamino-4,6-dichloro-s-triazine is added in portions to the filtrate at about 20–30° C. The reaction mixture is heated at 40–45° C. for 20 minutes and is then filtered, and the filtrate evaporated in vacuo to a thick paste which is then treated with about 75 parts of acetone, filtered and dried in vacuo.

EXAMPLE 8

2-methylthio-4-chloro-6-ethoxyamino-s-triazine

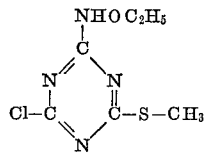

To a solution of 0.2 mole of ethoxyamine hydrochloride in 35 parts of water neutralized with 7.8 parts (0.19 mole) of sodium hydroxide in 35 parts of water, there is added at about 5° C. a solution of 0.1 mole of 2-methylthio-4,6-dichloro-s-triazine in 50 parts of dioxane. The reaction mixture is then heated at about 40° C. for one hour and then allowed to cool. After decanting the liquid portion, the solid residue is stirred with 150 parts of water, and the mixture is filtered. The product, after washing with water and drying in vacuo over $P_2O_5$, is crystallized from a mixture of water and a lower ether alcohol to give the product.

EXAMPLE 9

2-(o-methoxyphenyl-4,6-bis(N-methoxy-N-methylamino)-s-triazine

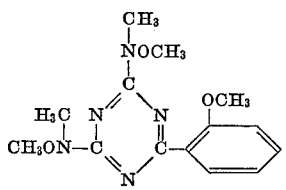

A solution of 1.6 moles of N-methyl-N-methoxyamine hydrochloride in 150 parts of water is neutralized at about 15° C. with a solution of 62.4 parts (1.56 moles) of sodium hydroxide in 150 parts of water. To the resulting solution there is added dropwise over a 15 minute period a solution of 0.24 mole of 2-(o-methoxyphenyl)-4,6-dichloro-s-triazine while maintaining the temperature at about 0° C. The reaction mixture is then stirred at 55–60° C. for one hour, followed by a reflux period (90° C.) for 3 hours. The cooled reaction mixture is filtered and the filter cake is washed with water. The product is purified by crystallization from aqueous methanol.

EXAMPLE 10

2,4-bis(ethylamino)-6-benzyloxyamino-s-triazine

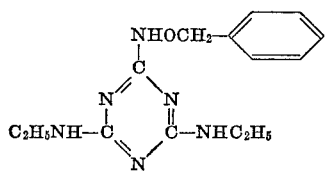

To a solution of 0.596 mole of benzyloxyamine hydrochloride in 60 parts of water, is added a solution of 23.2 parts (0.58 mole) of sodium hydroxide in 60 parts of water. Then the resulting solution is added over a 40 minute period to a slurry of 30.0 parts (0.149 mole) of 2-chloro-4,6-bis(ethylamino)-s-triazine in about 200 parts of dimethyl ether of diethyleneglycol while maintaining the temperature between 0° and 15° C. After the addition of 50 parts of water, the reaction mixture is heated for one hour at about 60° C. and for three hours at the reflux temperature. The cooled reaction mixture is filtered, and the precipitate is recrystallized from ethanol and then from aqueous methanol, giving the product.

EXAMPLE 11

2-pyrrolidino-4,6-bis(cyclopentoxyamino)-s-triazine

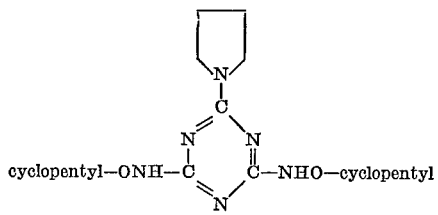

To a solution of 0.4 mole of cyclopentoxyamine hydrochloride in 35 parts of water is added a solution of 15.6 parts (0.39 mole) of sodium hydroxide in 35 parts of water. To the resulting solution, at about 5° C., is then added a solution of 0.05 mole of 2-pyrrolidino-4,6-dichloro-s-triazine in about 50 parts of dioxane. The reaction mixture is then heated at 40–50° C. for one hour followed by 2 hours reflux, cooled and filtered. The precipitate is washed with water and then with ether to give the product.

EXAMPLE 12

2-hexyl-4,6-bis(N-isopropoxy-N-ethylamino)-s-triazine

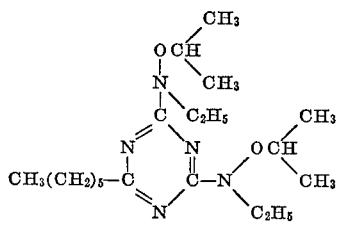

An aqueous dioxane suspension of 2,4-dichloro-6-hexyl-s-triazine is prepared by adding, in portions, a solution of 0.0689 mole of the triazine in 38 parts of dioxane to 70 parts of ice water at a temperature below 10° C. Then a solution of 0.137 mole of N-ethyl-N-isopropoxyamine in 48 parts of dioxane is added dropwise at about 2° C. in 22 minutes. After allowing the cream-colored reaction mixture to warm to 19° C., a solution of 5.7 parts (0.137 mole) of 97% sodium hydroxide in 20 parts of water is added dropwise, the final temperature and pH being 34° C. and 4, respectively. The temperature is brought to about 70° C. for a few minutes and then, after cooling, the product is separated by filtering. The filter cake is washed well with water and dried in vacuo to give the product.

EXAMPLE 13

2-phenyl-4,6-bis(N-allyloxy-N-allyl)-s-triazine

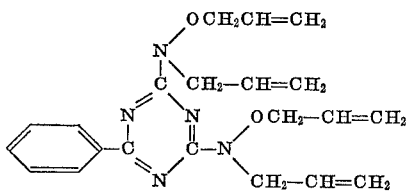

A solution of 0.0179 mole of 2-phenyl-4,6-dichloro-s-triazine in 9 parts of dioxane is added quickly to stirring ice water at 5° C. To the resulting slurry there is added a solution of 0.0358 mole of N-allyl-N-alloxyamine in 11.5 parts dioxane at about 2° C. in 8 minutes. After the mixture has been warmed to room temperature, about 11.5 parts of 3.12 N solution (0.0358 mole) of sodium hydroxide is added over 12 minutes at such a rate as to keep the mixture neutral or slightly alkaline. The temperature is brought to about 75° C. The mixture is chilled, and the aqueous phase is decanted. The residue is slurried with water several times and filtered, and after air drying, the product is washed with hexane.

EXAMPLE 14

2-phenyl-4,6-bis(N-methoxy-N-cyclohexyl-amino)-s-triazine

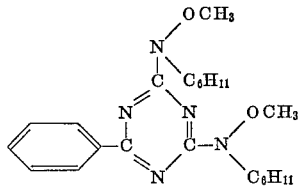

The procedure of Example 13 is repeated substituting an equivalent amount of N-cyclohexyl-N-methoxyamine for the allyloxyamine employed therein, and the product is readily obtained.

EXAMPLE 15

2-(p-trifluoromethylphenyl)-4,6-bis(ethoxy-amino)-s-triazine

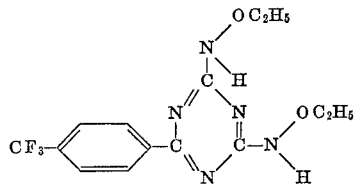

The procedure of Example 13 is repeated substituting equivalent amounts of ethoxyamine and 2-(p-trifluoromethylphenyl)-4,6-dichlorotriazine for the amine and triazine used therein, and the product is readily obtained.

EXAMPLE 16

2,4-di(p-chlorophenoxy)-6-benzyloxyamino-s-triazine

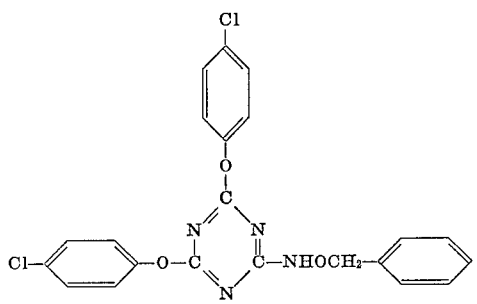

The procedure of Example 10 is repeated substituting an equivalent amount of 2,4-di-(p-chlorophenoxy)-6-chloro-s-triazine for the triazine employed therein, and the product is obtained.

EXAMPLE 17

2,4-dichloro-6-methoxyamino-s-triazine

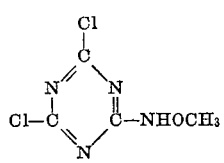

A suspension formed by the addition of a solution of 55.4 parts (0.3 mole) of cyanuric chloride in 143 parts of dioxane to 180 parts of ice-water (maximum temperature 10° C.) is treated dropwise at about 3.5° C. with a solution of methoxyamine prepared by neutralizing 25 parts (0.3 mole) of methoxyamine hydrochloride with a solution of 12.5 parts (0.3 mole) of 97% sodium hydroxide in 28 parts of water; the final pH is about 2.5. A solution of 12.5 parts (0.3 mole) of 97% sodium hydroxide in 41 parts of water is added dropwise at about 3° C. in 9 minutes. The yellow suspension is stirred for one hour in the cold and is filtered. The cake is washed with water. The product (35.1 parts) dried in vacuo over $P_2O_5$, melts at about 149° C.

EXAMPLE 18

2-chloro-4,6-bis(methoxyamino)-s-triazine

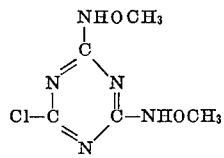

A solution of 27.7 parts (0.15 mole) of cyanuric chloride in 60 parts of dioxane is added slowly to 200 parts of ice water at 0–10° C. To this vigorously stirred slurry there is then added dropwise at about 3° C., a solution of methoxyamine prepared by neutralizing a solution of 25 parts (0.3 mole) of methoxyamine hydrochloride dissolved in 73 parts of water with 12.5 parts (0.3 mole) of 97% sodium hydroxide in 33 parts of water at a temperature below 25° C. The addition requires about 45 minutes, the final pH being 4; the mixture is allowed to warm to 24° (a little heat finally being required); the pH is now 1. A solution of 12.5 parts (0.3 mole) of 97% sodium hydroxide in 37 parts of water is then added dropwise over a 15 minute period during which time the temperature rises to about 43° C. and the final pH is 8. The mixture is allowed to cool to 35° C. over a 20 minute period, and is then chilled in ice for 1 hour. The product is separated by filtration, and the cake is washed with water. The product (16.8 parts), melts at 167–168° C.

EXAMPLE 19

2,4,6-tris(methoxyamino)-s-triazine

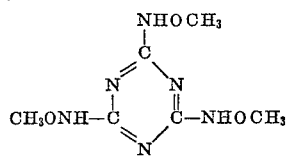

A mixture of 10.8 parts (0.0526 mole) of 2-chloro-4,6-bis(methoxyamino)-s-triazine, 40 parts of water and a solution of methoxyamine, prepared by neutralizing 4.84 parts (0.058 mole) of methoxyamine hydrochloride in 10 parts of water with 18.6 parts of 3.12 N sodium hydroxide (0.058 mole), is slowly heated to a gentle reflux. Before the reflux temperature is reached, the mixture becomes acid (pH 4) and 3.12 N sodium hydroxide is added at such a rate as to keep the mixture neutral or slightly alkaline. The final pH is about 8. Refluxing is continued for about 20 minutes following completion of addition, and then the mixture is chilled filtered and the cake washed with water. The dry cake (9 parts) melts at 209.5–210° C. with decomposition.

EXAMPLE 20

2-chloro-4,6-bis(ethoxyamino)-s-triazine

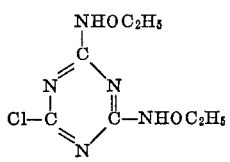

3.32 parts (0.018 mole) of cyanuric chloride, dissolved in about 10 parts of dioxane, is dripped into 15 parts of ice and water at about 2° C. The fine suspension which forms is then treated dropwise at about 3° C. with a solution of ethoxyamine prepared by neutralizing 3.15 parts (0.036 mole) of ethoxyamine hydrochloride in 10 parts of water with 1.49 parts (0.036 mole) of 97% sodium hydroxide in 5 parts of water at a temperature below 10° C. The mixture (pH 1–2) is allowed to warm to about 23° C., and a solution of 1.49 parts (0.036 mole) of 97% sodium hydroxide in 10 parts of water is added dropwise at such a rate as to keep the mixture neutral or slightly alkaline. The mixture is warm to about 43°

EXAMPLE 21

2-piperidino-4,6-bis(methallyloxyamino)-s-triazine

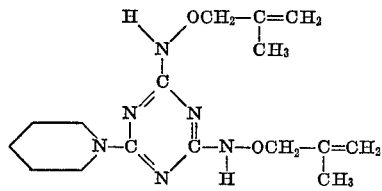

A mixture of 0.031 mole of 2-chloro-4,6-bis(methallyloxyamino)-s-triazine, 0.093 mole of piperidine and about 100 parts of dioxane is heated at reflux for six hours and is then allowed to cool overnight. The precipitate which forms on addition of about 1000 parts of water is filtered off and air-dried, giving the product. It may be converted to the formic acid salt by treatment with formic acid.

EXAMPLE 22

2-diethylamino-4,6-bis(methoxyamino)-s-triazine

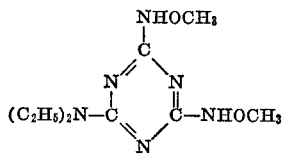

A suspension of 5 parts of 2-chloro-4,6-bis(methoxyamino)-s-triazine in 20 parts of water is treated with 1.77 parts (0.0243 mole) of diethylamine, and the mixture is slowly heated to the reflux. Addition of 24.3 parts of 1 N sodium hydroxide solution is made at such a rate as to keep the mixture neutral or slightly alkaline. The pale yellow oil which forms on cooling becomes a hard plastic-like solid. The aqueous phase is decanted off, and the solid residue, after stirring and breaking up with fresh water, is filtered off and allowed to air-dry to give 3 parts of material of melting point 97–104° C. 2.7 parts of this material is recrystallized from 80 parts of hexane plus 1.5 parts of benzene. The dried material (1.21 parts) melts partially at 93–97° C., resolidifies and melts completely at 105–108° C.

EXAMPLE 23

2-(4-benzylpiperazino)-4,6-bis(methoxyamino)-s-triazine

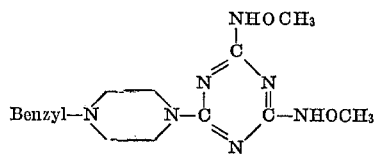

A mixture of 5 parts (0.0243 mole) of 2-chloro-4,6-bis(methoxyamino)-s-triazine, 0.0292 mole of 4-benzylpiperazine and 40 parts of water is heated slowly during which time 1 N sodium hydroxide is added to keep the mixture neutral or slightly alkaline. Before reflux is reached, all the base (about 24.8 parts) is added, pH 4. The mixture is refluxed for one hour, chilled and filtered to give the product, which is washed with water.

The corresponding 2-piperazino-s-triazine is obtained by employing an equimolar amount of piperazine in place of the 4-benzylpiperazine.

EXAMPLE 24

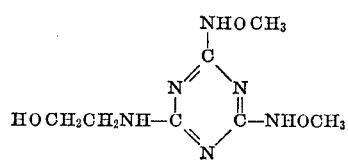

The procedure of Example 22 is repeated using an equivalent amount of beta-hydroxyethylamine in place of the diethylamine used therein.

EXAMPLE 25

2,4-bis(methoxyamino)-6-phenoxy-s-triazine

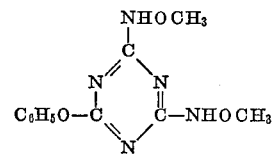

To a solution of 2.4 parts (0.0255 mole) of phenol and 1.02 parts (0.0255 mole) of 97% sodium hydroxide in 25 parts of water is added 5.0 parts (0.0243 mole) of 2-chloro-4,6-bis(methoxyamino)-s-triazine. The mixture is refluxed for 1.5 hours and cooled, and the aqueous phase is decanted from a taffy-like material which is placed in vacuo over $P_2O_5$. The dry material (4.7 parts) melts at 141–148° C.

EXAMPLE 26

2,4-bis(methoxyamino)-6-phenylmercapto-s-triazine

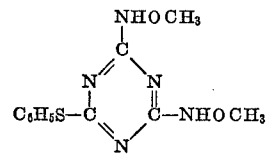

The procedure of Example 25 is repeated using an equivalent amount of phenylmercaptan in place of the phenol, thereby yielding the desired product.

Likewise, the corresponding 6-(p-chlorophenylmercapto)-s-triazine is obtained by employing as the mercaptan, p-chlorophenylmercaptan.

EXAMPLE 27

2-mercapto-4,6-bis(methoxyamino)-s-triazine

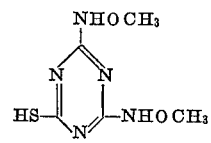

The procedure of Example 22 is followed using an equivalent amount of sodium hydrosulfide in place of the diethylamine and omitting the addition of the 1 N sodium hydroxide, and the product is thereby obtained.

EXAMPLE 28

2,4-difluoro-6-methoxyamino-s-triazine

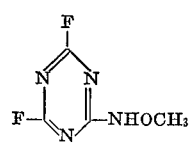

The procedure of Example 17 is repeated using an equivalent amount of cyanuric fluoride in place of cyanuric chloride, and the product is thereby obtained.

EXAMPLE 29

2-chloro-4,6-bis(propargyloxyamino)-s-triazine

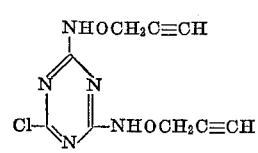

The procedure of Example 20 is repeated using an equivalent amount of propargyloxyamine in place of ethoxyamine to give the desired product.

EXAMPLE 30

2,4-bis(hydroxymethylamino)-6-methoxyamino-s-triazine

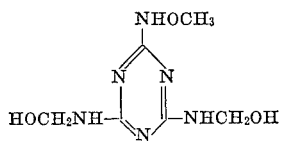

A slurry of 0.1 mole of 2,4-diamino-6-methoxyamino-s-triazine in an aqueous solution containing 0.22 mole of formaldehyde is stirred at 40° C. (pH=8) for 1 hour followed by one-half hour at 80° C. The mixture on cooling deposits the desired product as a precipitate.

EXAMPLE 31

2-ethoxyethoxy-4-ethoxymethyl-6-(N-benzyl-N-propargyloxyamino)-s-triazine

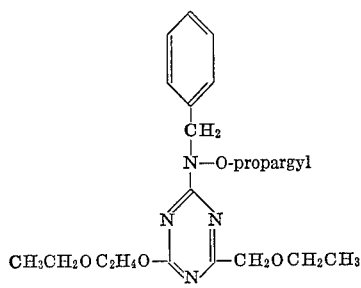

A mixture of 0.1 mole of 2-chloro-4-ethoxyethoxy-6-ethoxymethyl-s-triazine and 0.4 mole of N-benzyl-N-propargyloxyamine in 150 ml. of water is heated at reflux for 3 hours, cooled and the crude product isolated by filtration. The product is further purified by slurrying in hexane.

EXAMPLE 32

2,4-diamino-6-methoxyamino-s-triazine

A mixture of 7.15 g. (0.05 mole) of thioammeline, 0.2 mole of methoxyamine hydrochloride and 200 ml. of Cellosolve is heated at reflux for two hours. The mixture is filtered hot, and the cake washed with methanol and then air-dried. The free base of the desired compound is obtained by slurrying this material in water and neutralizing to pH 8 by the dropwise addition of 20% caustic.

EXAMPLE 33

2,4,6-tris(N-methyl-N-methoxyamino)-s-triazine

A 200 ml., nickel-lined autoclave is charged with 86 g. (1 mole) of N-methyl-N-methoxy cyanamide. Anhydrous HCl is added to 500 p.s.i., and the mixture is rocked at room temperature for 100 hours. The content of the clave is removed with the aid of one liter of water, neutralized to pH 8 with caustic and is allowed to evaporate to one-third volume to yield crystals of the desired product.

EXAMPLE 34

2,4,6-tris(N-methyl-N-methoxyamino)-s-triazine

A mixture of 0.3 mole of N-methyl-N-methoxy-2-methyl-pseudourea and 0.03 mole of acetic acid is stirred at room temperature for 24 hours. The crystals of 2,4,6-tris(N-methyl-N-methoxyamino)-s-triazine which form are filtered and are washed with water.

EXAMPLE 35

2,4-bistrichloromethyl-6-N-methyl-N-methoxyamino-s-triazine

A stream of dry hydrogen chloride is passed through a mixture of 0.5 mole of trichloroacetonitrile and 0.25 mole of N-methoxy-N-methyl cyanamide, cooled in an ice-salt mixture until the mixture is saturated. After four days the mixture is filtered, and the product is recrystallized from aqueous ethanol.

EXAMPLE 36

2,4-dimethyl-6-(N-methyl-N-methoxyamino)-s-triazine

A mixture of 0.2 mole of methylacetimidate, 0.1 mole of N-methyl-N-methoxyamino-2-methyl pseudourea and 0.02 mole of acetic acid is stirred at room temperature for three days. The product is largely the desired one with a small amount of 2,4,6-trimethyl-s-triazine.

EXAMPLE 37

2,4-diamino-6-(N-methoxy-N-methylamino)-s-triazine 0.1 mole of biguanide and 0.09 mole of methyl-N-methoxy-N-methyl carbamate are refluxed in 60 ml. of methanol for three hours. The product separates on cooling.

EXAMPLE 38

2,4-diamino-6-(N-methyl-N-butoxyamino)-s-triazine

A solution of 0.8 g. (0.0121 mole) of 85% potassium hydroxide in 25 ml. of ethylene glycol monomethylether is treated with 18.5 g. (0.22 mole) of powdered dicyandiamide and 0.2 mole of N-methyl-N-butoxy cyanamide. The mixture is stirred and refluxed for 20 minutes, neutralized with acetic acid and the product isolated by solvent removal at reduced pressure.

EXAMPLE 39

2-amino-4-methoxyamino-6-trifluoromethyl-s-triazine

A solution of 0.1 mole of methoxy biguanide in 50 ml. of methanol is treated dropwise with 0.12 mole of methyl trifluoroacetate. The mixture is refluxed for three hours, and the product precipitates on cooling.

EXAMPLE 40

2,4-bis(ethylamino)-6-methoxyamino-s-triazine

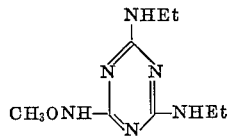

Five parts of 2,4-dichloro-6-methoxyamino-1,3-5-s-triazine are treated with 40 parts of water and stirred until a fine slurry is formed. To this slurry 9.12 parts of a 70% aqueous solution of ethylamine are added, and the combination is refluxed for one and ¾ hours before cooling to room temperature. The clear, supernatant liquid is decanted from the amorphous mass which had formed, and the latter is treated with water several times until it becomes brittle in nature. After drying, 2 parts of material, melting at about 88.5 to 91.5° C., is obtained.

EXAMPLE 41

2-methoxy-4,6-bis(methoxyamino)-s-triazine

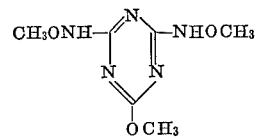

A solution of 18.35 parts of methoxyamine hydrochloride in 40 parts of water is neutralized with NaOH at 25–30° C. and added dropwise to a slurry of 18 parts 2,4-dichloro-6-methoxy-s-triazine compound in 75 parts of H₂O at 2–8° C. The resultant thick slurry is warmed to room temperature and Na₂CO₃ (.11 M) and 200 parts of water are added. The mixture is slowly heated to 75–80° C. to form a clear solution. Most of the water is removed by evaporation, and the resultant thick slurry is filtered. The filtrate is evaporated and the oily residue, on chilling, solidifies. After recrystallization from ethyl acetate, the product has a melting point of about 104–105° C.

EXAMPLE 42

2-(p-chloroanilino)-4,6-bis(methoxyamino)-s-triazine

Five parts of 2-chloro-4,6-methoxyamino-s-triazine are slurried in 30 mls. of water. To this slurry, 3.82 parts of p-chloroaniline and an additional 10 parts of water are added. The pH of this slurry is about 4. A 1 N NaOH solution (0.0243 M) is slowly added until the pH of the slurry is alkaline. The remainder of the NaOH solution is added as the temperature of the slurry is slowly raised to reflux. After all of the NaOH has been added, the pH is 4.0. After refluxing for one hour, the reaction mixture is allowed to cool to room temperature, chilled, and filtered. The residue is washed with water, and vacuum-dried for 72 hours to give the product melting with decomposition at about 195° C.

EXAMPLE 43

2-diethylamino-4,6-bis(methoxyamino)-s-triazine

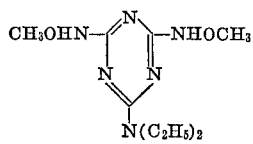

9.2 parts of sodium are dissolved in methanol and cooled to 8° C. 21.4 parts of 2-diethylamino-4,6-bis-hydroxyamino-s-triazine are added and, after a short period of stirring, 58.2 parts of methyl iodide are added at 8° C. The temperature increases to 20°. The temperature is maintained, and, after stirring overnight, the mixture is refluxed for 7 hours.

The reaction mixture is cooled, 100 parts of water are added and the mixture is extracted with chloroform. The solvent is removed, and the residual oil is distilled under reduced pressure (B.P. 119–121° C. at 1 mm). The product is a pale yellow oil.

EXAMPLE 44

2-chloro-4,6-bis(ethoxyamino)-s-triazine

The procedure of Example 18 is repeated, reacting a dioxane-water solution of 0.15 mole of cyanuric chloride with a solution of 0.3 mole of ethoxyamine hydrochloride which has been neutralized with sodium hydroxide. After the reaction is complete, the product is collected by filtration and washed with water.

EXAMPLE 45

2-chloro-4,6-bis(butoxyamino)-s-triazine

The procedure of Example 18 is repeated reacting a dioxane-water solution of 0.15 mole of cyanuric chloride with a solution of 0.3 mole of butoxyamine hydrochloride which has been neutralized with sodium hydroxide. After the reaction is complete, the product is collected and washed with water.

EXAMPLE 46

2,4-dichloro-6-methoxyamino-s-triazine

A stirring solution of 18.4 parts (0.1 mole) of cyanuric chloride in 300 ml. of ether is cooled to 0° C. and treated with 8.6 parts (0.1 mole) of methoxyamine hydrochloride. The mixture is then treated dropwise at 0–5° C. over a two-hour period with 8.24 parts (0.2 mole) of 97% sodium hydroxide dissolved in 50 ml. of water. After completion of the addition, the mixture is stirred for an additional 1½ hours at 2–4° C., and the layers are separated. The ether layer is allowed to evaporate at room temperature, and the product is obtained as a solid and dried "in vacuo" over phosphorus pentoxide.

EXAMPLE 47

2-p-chloroanilino-4-chloro-6-methoxyamino-s-triazine

A solution of 3.6 parts (0.028 mole) of p-chloroaniline in 16 ml. of dioxane is added dropwise at 26–33° C. over a five-minute period with stirring to a turbid solution of 5 parts (0.026 mole) of 2,4-dichloro-6-methoxyamino-s-triazine in 25 ml. of dioxane. The temperature is raised to 45° C. for a few minutes and then allowed to fall to 40° at which time 1.4 parts (0.013 mole) of sodium carbonate in 50 ml. of water is added dropwise while maintaining the temperature in the range of 38–42° C. After completing the addition, the mixture is allowed to cool to room temperature and the water phase decanted away from the gummy material which was collected. After purification by dissolving in ether and precipitation by the addition of hexane, followed by another recrystallization from ether-hexane, the product is obtained as a crystalline solid.

EXAMPLE 48

2,4-bis(methoxyamino)-6-morpholino-s-triazine

To a solution of 5.15 parts (0.025 mole) of 2-chloro-4,6-bis(methoxyamino)-s-triazine in 50 parts of dioxane is added dropwise at room temperature over a 10 minute period, 5.23 parts (0.060 mole) of morpholine. An exothermic reaction raises the temperature to 65° C. The reaction mixture is stirred for 0.5 hour and then heated on a steam bath for 0.5 hour. The reaction mixture is cooled and filtered. Evaporation of the filtrate on a hot water bath under vacuum gives the crude product, which is triturated in hot water, filtered and recrystallized from 150 parts of hot ethanol to yield 4.7 parts (74%) of analytically pure product, M.P. 184–186° C.

EXAMPLE 49

2,4-bis(methoxyamino)-6-(4-methyl-1-piperazinyl)-s-triazine

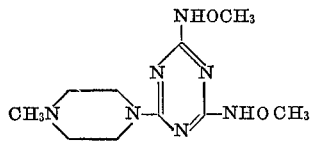

The procedure of Example 48 is repeated substituting an equivalent amount of N-methylpiperazine for the morpholine employed therein. The product, M.P. 158–160° C., is obtained in 36% yield.

EXAMPLE 50

2-cyclohexylamino-4,6-bis(methoxyamino)-s-triazine

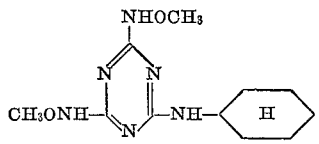

The procedure of Example 48 is repeated substituting an equivalent amount of cyclohexylamine for the morpholine employed therein. The product is obtained in 78% yield as a low melting solid in a substantially pure state.

EXAMPLE 51

2-ethoxy-4,6-bis(methoxyamino)-s-triazine

The procedure of Example 41 is repeated substituting an equivalent amount of 2,4-dichloro-6-ethoxy-s-triazine for 2,4-dichloro-6-methoxy-s-triazine employed therein. The product, M.P. 144–146° C., after recrystallization from ethanol, is obtained in 53% yield.

EXAMPLE 52

2-chloro-4-cyclopropylamino-6-methoxyamino-s-triazine

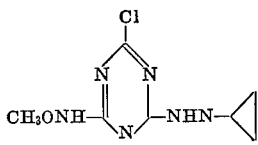

2-cyclopropylamino-4,6-dichloro-s-triazine is prepared "in situ" according to Example 17, substituting an equivalent amount of cyclopropylamine for methoxyamine employed therein. This intermediate is then treated "in situ," at 5–8° C., with one equivalent amount of methoxyamine in water and the temperature raised to 25–30° C. One equivalent of sodium carbonate is then added, and the reaction mixture is stirred at this temperature for one hour. The product is filtered off and recrystallized from methanol to give pure material, M.P. 157–158° C., in 46% yield.

EXAMPLE 53

2-(allyloxy)-4,6-bis(methoxyamino)-s-triazine

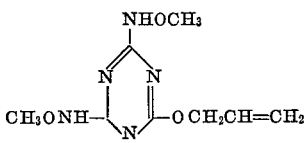

The procedure of Example 41 is repeated substituting an equivalent amount of 2,4-dichloro-6-(allyloxy)-s-triazine for 2,4-dichloro-6-methoxy-s-triazine employed therein. The product, M.P. 148–150° C., is obtained in 55% yield.

EXAMPLE 54

2,4-bis(allyloxyamino)-6-methoxy-s-triazine

The procedure of Example 41 is repeated, substituting an equivalent amount of allyloxyamine for methoxyamine employed therein. The product, M.P. 104–106° C., is obtained in 16% yield.

EXAMPLE 55

2-[(allyloxy)amino]-4-chloro-6-methoxy-s-triazine

The procedure of Example 41 is repeated, substituting one-half equivalent quantity of allyloxyamine for methoxyamine employed therein. The product, M.P. 78–81° C., is obtained in 88% yield.

EXAMPLE 56

2-[(allyloxy)amino]-4-methoxy-6-morpholino-s-triazine

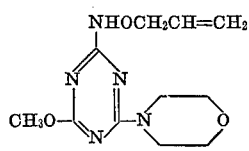

2 - [(allyloxy)amino] - 4 - chloro - 6-methoxy-s-triazine (Example 55), 3.9 parts (0.018 mole) in 40 parts of dioxane is reacted with 3.5 parts (0.040 mole) of morpholine at room temperature for 3 hours. The reaction mixture is filtered, and the filtrate is evaporated to dryness on a water bath under vacuum. Recrystallization of the crude residue from 20 parts of ethanol gives 1.7 parts of analytically pure product (55%), M.P. 102–104° C.

EXAMPLE 57

2-(allyloxy)-4-chloro-6-methoxyamino-s-triazine

The procedure of Example 41 is repeated, substituting 2-allyloxy-4,6-dichloro-s-triazine for 2,4-dichloro-6-methoxy-s-triazine, and one-half equivalent quantity of methoxyamine hydrochloride reported therein. The product, M.P. 83–85° C., is obtained in 36% yield.

EXAMPLE 58

2-(allyloxy)-4-[(benzyloxy)amino]-6-methoxyamino-s-triazine

The procedure of Example 41 is repeated, substituting 2 - (allyloxy)-4-chloro-6-methoxyamino-s-triazine (Example 57) for 2,4-dichloro-6-methoxy-s-triazine, and one-half equivalent quantity of benzyloxyamine hydrochloride for methoxyamine hydrochloride reported therein. Reaction mixture is heated at 90–95° C. for two hours. The product, M.P. 140–142° C., is obtained in 72% yield.

EXAMPLE 59

2-chloro-4-methoxyamino-6-[(3-methoxypropyl)amino]-s-triazine

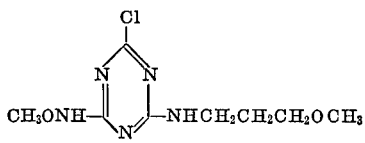

2-[(3 - methoxypropyl)amino]-4,6-dichloro-s-triazine is prepared "in situ" according to Example 17, substituting an equivalent amount of 3-methoxypropylamine for methoxyamine employed therein. This intermediate is then treated "in situ," at 5–10° C., with one equivalent of methoxyamine in water. The reaction mixture is stirred at 25–30° C. for ½ hour and then adjusted to pH 7–8. The crystalline product on recrystallization from methanol melts at 121–123° C.

EXAMPLE 60

2-[(benzyoxy)amino]-4-chloro-6-methoxy-s-triazine

The procedure of Example 41 is repeated, substituting one-half equivalent quantity of benzyloxyamine hydrochloride for methoxyamine hydrochloride reported therein. The product, M.P. 105–107° C. is used without further purification for the preparation of 2-[(benzyloxy)amino]-4-methoxy-6-methoxyamino-s-triazine (Example 61).

EXAMPLE 61

2-[(benzyloxy)amino]-4-methoxy-6-methoxyamino-s-triazine

2-[(benzyloxy)amino] - 4 - chloro-6-methoxy-s-triazine is reacted with methoxyamine as described in Example 41. Recrystallization of the product from ethanol yields 41% of analytically pure material, M.P. 135–137° C.

EXAMPLE 62

2-ethoxy-4,6-bis(ethoxyamino)-s-triazine

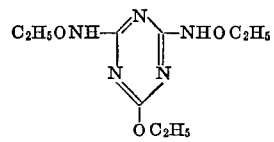

The procedure of Example 41 is repeated, substituting 2,4-dichloro-6-ethoxy-s-triazine and ethoxyamine hydrochloride for an equivalent quantity of 2,4-dichloro-6-methoxy-s-triazine and methoxyamine hydrochloride, respectively, reported therein. The product, M.P. 153–155° C., is obtained in 41% yield.

EXAMPLE 63

2-[(allyloxy)amino]-4,6-bis(methoxyamino)-s-triazine

The procedure of Example 41 is repeated, substituting 2-chloro - 4,6 - bis(methoxyamino)-s-triazine for 2,4-dichloro-6-methoxyamino-s-triazine and substituting one-half equivalent of allyloxyamine hydrochloride for methoxyamine hydrochloride reported therein. The solution is adjusted to pH 4.5–5 and cooled in an ice bath. After 2 hours the solid product is collected. Recrystallization from water yields 8.4 parts of pure product (66%), M.P. 134–136°.

EXAMPLE 64

2,4-bis[(ethoxy)amino]-6-methoxy-s-triazine

The procedure of Example 41 is repeated, substituting an equivalent amount of ethoxyamine hydrochloride for methoxyamine hydrochloride employed therein. The product, M.P. 106–108°, is obtained in 50% yield.

EXAMPLE 65

2-(3,4,5-trimethoxyanilino)-4,6-bis(methoxyamino)-s-triazine

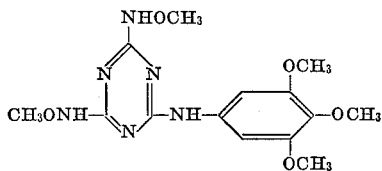

A suspension of 5.15 parts (0.025 mole) of 2-chloro-4,6-bis(methoxyamino)-s-triazine and 4.89 parts (0.030 mole) of 3,4,5-trimethoxyaniline in 75 parts of water is stirred while the temperature of the reaction mixture is raised to reflux. Several drops of a solution of sodium hydroxide, 1.03 parts (0.025 mole) in 25 parts of water are added to pH 8. The remainder of the alkaline solution is added in one portion when the reaction mixture is at 80° C. The reaction mixture is heated under reflux for 2 hours and cooled in an ice bath. The solid product is collected by filtration, washed with water and air-dried to yield 7.4 parts of product (84%), M.P. 177–178° C. dec. Recrystallization from 300 parts of ethanol yields 4.9 parts of analytically pure product, M.P. 181–183° C.

EXAMPLE 66

2-(m-chloroanilino)-4,6-bis(methoxyamino)-s-triazine

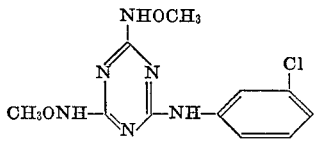

2-m-chloroanilino-4,6-dichloro-s-triazine is prepared "in situ" according to Example 17, substituting an equivalent amount of m-chloroaniline for the methoxyamine employed therein. This intermediate is then treated "in situ" with two equivalents of aqueous methoxyamine according to Example 41 and the reaction mixture maintained at 25–30° C. for approximately 1–2 hours. The reaction mixture is then cooled, filtered, and the filtrate evaporated. The solid residue is recrystallized from ethanol to give 27% of product, M.P. 131–132°.

EXAMPLE 67

2-anilino-4,6-bis(methoxyamino)-s-triazine 2-anilino-4,6-dichloro-s-triazine is prepared according to Example 17, substituting an equivalent amount of aniline for methoxyamine employed therein. This crude intermediate is then reacted at 60° C., with two equivalents of methoxyamine according to Example 41. The crude solid product is recrystallized from acetone to give 37% of pure material, M.P. 175–176°.

EXAMPLE 68

2-dimethylamino-4,6-bis(methoxyamino)-s-triazine

The procedure of Example 48 is repeated, substituting an equivalent amount of dimethylamine for the morpholine employed therein. The reaction mixture is heated to 35° C. The product, M.P. 147–148°, is obtained in 88% yield.

EXAMPLE 69

2,4-bis(methoxyamino)-6-(1-pyrrolidinyl)-s-triazine

The procedure of Example 48 is repeated, substituting an equivalent amount of pyrolidine for the morpholine employed therein. The product, M.P. 159–160° C., is obtained in 39% yield.

EXAMPLE 70

2,4-bis(methoxyamino)-6-piperidino-s-triazine

The procedure of Example 48 is repeated, substituting an equivalent amount of piperidine for the morpholine employed therein. The product, M.P. 151–152° C., is obtained in 53% yield.

EXAMPLE 71

2,4-bis[(benzyloxy)amino]-6-chloro-s-triazine

The procedure of Example 17 is repeated, substituting two equivalents of benzyloxyamine for methoxyamine employed therein. The reaction mixture is stirred at room temperature (25–30° C.) for 0.5 hour. The product, M.P. 199–201° C., was obtained in 75% yield.

EXAMPLE 72

2-methoxyamino-4,6-dimorpholino-s-triazine

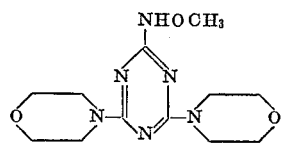

The procedure of Example 17 is repeated. The product, i.e., 2,4-dichloro-6-methoxyamino-s-triazine is reacted with four equivalents of morpholine according to Example 48 and the desired product isolated as described therein.

EXAMPLE 73

2,4-bis(cyclopropylamino)-6-methoxyamino-s-triazine

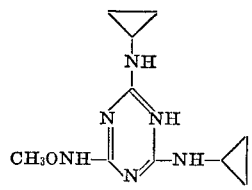

2-chloro-4-cyclopropylamino - 6 - methoxyamino-s-triazine (Example 52) is reacted with two equivalents of cyclopropylamine according to Example 48 and the product isolated as described therein.

EXAMPLE 74

2-cyclopropylamino-4,6-bis(methoxyamino)-s-triazine

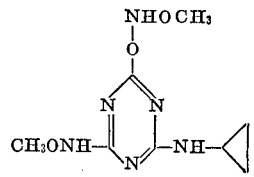

2-chloro-4-cyclopropylamino-6-methoxyamino-s-triazine (Example 52) is reacted with two equivalents of methoxyamine as described in Example 52. The reaction mixture is heated at 80–90° C. for one hour.

EXAMPLE 75

2-iso-propoxy-4,6-bis(methoxyamino)-s-triazine

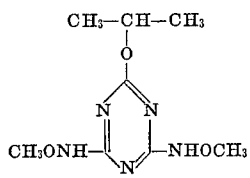

The procedure of Example 41 is repeated, substituting an equivalent amount of 2,4-dichloro-6-iso-propoxy-s-triazine for the triazine employed therein, and the product is obtained, M.P. 148–150° C.

EXAMPLE 76

2-n-propoxy-4,6-bis(methoxyamino)-s-triazine

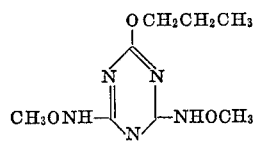

The procedure of Example 41 is repeated, substituting an equivalent amount of 2,4-dichloro-6-n-propoxy-s-triazine for the triazine employed therein, and the product is obtained, M.P. 156–158° C.

EXAMPLE 77

2,4-bis(methoxyamino)-6-(2,6-dimethylmorpholino)-s-triazine

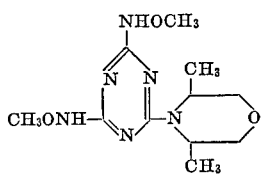

The procedure of Example 48 is repeated, substituting an equivalent amount of 2,6-dimethylmorpholine for the morpholine employed therein. The product is isolated as described therein.

EXAMPLE 78

2,4-bis(methoxyamino)-6-(2-methylpyrrolidino)-s-triazine

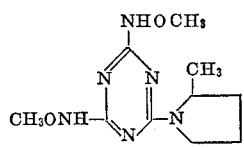

The procedure of Example 48 is repeated, employing an equivalent amount of 2-methylpyrrolidine for the morpholine employed therein. The product is isolated as described therein.

EXAMPLE 79

Tablets of 2-methoxy-4,6-bis(methoxyamino)-s-triazine

| | Per tablets, grams | For 10,000 tablets, grams |
|---|---|---|
| Active ingredient: | | |
| 2-methoxy-4,6-bis(methoxyamino)-s-triazine | 0.020 | 200 |
| Corn starch (for mix) | 0.015 | 150 |
| Corn starch (for paste) | 0.015 | 150 |
| Alginic acid | 0.020 | 200 |
| Methocel (400 centipoises) | 0.005 | 50 |
| Total | 0.075 | 750 |
| Magnesium stearate (1%) | 0.001 | 10 |
| Grand total | 0.076 | 760 |

The active ingredient, corn starch (for mix), alginic acid, and Methocel are blended together. The corn starch (for paste) is suspended in 600 milliliters of water and heated, with stirring to form a paste. This paste is then used to granulate the mixed powders. Additional water is used, if necessary. The wet granules are passed through a No. 8 hand screen and dried at 120° F. The dry granules are then passed through a No. 16 screen. The mixture is lubricated with 1% magnesium stearate and compressed into tablets in a suitable tableting machine.

EXAMPLE 80

Preparation of pharmaceutical syrup containing 2-methoxy-4,6-bis(methoxyamino)-s-triazine 2-methoxy-4,6-bis(methoxyamino)-s-triazine is incorporated into a standard pharmaceutical syrup according to the following formulation:

| | Percent by weight |
|---|---|
| 2-methoxy-4,6-bis(methoxyamino)-s-triazine | 0.5 |
| Sucrose | 40–60 |
| Cherry flavor | 0.1 |
| F.D. and C. Red Dye #2 | 0.05 |
| Methyl parabens | 0.08 |
| Propyl parabens | 0.02 |
| q.s. Distilled water. | |

EXAMPLE 81

Pharmaceutical properties of (N-monooxyamino)-s-triazines

The pharmaceutical properties of the (N-monooxyamino)-s-triazines of this invention are demonstrated in several ways. A useful tranquilizer test consists of measuring the reduction of spontaneous motor activity in animals using the following procedure. The compounds of this invention are administered intraperitoneally at graded dose levels to groups of five mice. At the time of peak effect, each group of mice is placed in an actophotometer (photoelectric device for quantitatively measuring locomotor activity) for a period of five minutes. Parallel control groups of five mice are given starch vehicle and their activity is also determined in a similar fashion. The average motor activities of the treated and control groups are compared, and the percent reduction of motor activity due to the active agent, is calculated. If desired, the dose which produces a 50% reduction in motor activity ($ED_{50}$) is calculated from the results of administration of several different dose levels.

The dose causing lethality (LD) in a small percentage of animals may also be determined. This procedure is used to demonstrate a desirably satisfactory spread between effective and toxic ranges, and a therapeutic index (ratio of lethal to motor depression doses) may be calculated.

When tested by these procedures, (N-monooxyamino)-s-triazines of this invention demonstrate good tranquilizer activity at non-toxic dose levels exemplified, in part, as follows.

| Compound | ED₅₀, mg./kg. i.p. | LD, mg./ kg.₅₀.p. | Therapeutic ratio, LD/ED₅₀ |
|---|---|---|---|
| 2,4-dimethoxy-6-methoxyamino-s-traizine | 23 | >230 | >10 |
| 2,4-bis (ethylamino)-6-methoxyamino-s-triazine | 34 | 340 | 10 |
| 2-methoxyamino-4,6-dimorpholino-s-triazine | 25 | >250 | >10 |
| 2-chloro-4-methoxyamino-6-[(3-methoxypropyl) amino]-s-triazine | 68 | >680 | >10 |
| 2-chloro-4-cyclopropylamino-6-methoxyamino-s-triazine | 10 | >100 | >10 |
| 2.4.6-tris (N-methyl-N-methoxyamino)-s-triazine | 27 | >300 | >11 |
| 2,4,6-tris (methoxyamino)-s-triazine | 70 | >700 | >10 |
| 2-methoxy-4,6-bis(methoxyamino)-s-triazine | 8 | 960(LD₅₀) | 120 |
| 2-ethoxy-4-6-bis(methoxyamino)-s-triazine | 6 | >200 | >33 |
| 2-(allyloxy)-4,6-bis(methoxyamino)-s-triazine | 10 | >100 | >10 |
| 2-ethoxy-4,6-bis(ethoxyamino)-s-triazine | 36 | >400 | >11 |
| 2-[(benzyloxy)amino]-4-methoxy-6-methoxyamino-s-triazine | 64 | 640 | 10 |
| 2,4-bis(methoxyamino)-6-phenoxy-s-triazine | 61 | >610 | >10 |
| 2-dimethylamino-4,6-bis(methoxyamino)-s-triazine | 29 | >300 | >10 |
| 2-diethylamino-4,6-bis(methoxyamino)-s-triazine | 26 | >260 | >10 |
| 2-cyclohexylamino-4,6-bis(methoxyamino)-s-triazine | 10 | >150 | >15 |
| 2-cyclopropylamino-4,6-bis(methoxyamino)-s-triazine | 9 | >90 | >10 |
| 2,4-bis(methoxyamino)-6-(1-pyrrolidinyl)-s-triazine | 14 | >200 | >14 |
| 2,4-bis(methoxyamino)-6-morpholino-s-triazine | 5 | 800 | 160 |
| 2,4-bis(ethoxyamino)-6-morpholino-s-triazine | 27 | >270 | >10 |
| 2,4-bis(methoxyamino)-6-piperidino-s-triazine | 20 | >400 | >20 |
| 2,4-bis(methoxyamino)-6-(4-methyl-1-piperazinyl) s-triazine | 12 | >500 | >41 |
| 2-(m-chloroanilino)-4,6-bis(methoxyamino)-s-triazine | 47 | >470 | >10 |
| 2-(p-chloroanilino)-4,6-bis(methoxyamino)-s-triazine | 63 | >1,660 | >26 |
| 2-chloro-4,6-bis(methoxyamino)-s-triazine | 100 | 1,000(50%) | 10 |

I claim:
1. A composition in dosage unit form producing tranquility in animals comprising:
   (A) a pharmaceutically acceptable carrier; and
   (B) an effective tranquilizing amount of a member selected from the group consisting of (a) (N-monooxyamino)-s-triazine of the formula

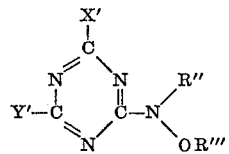

wherein X' and Y' are individually selected from the group consisting of hydrogen, lower alkyl, halogenated lower alkyl, phenyl lower alkyl, lower alkoxy, lower alkenyloxy, lower alkylmercapto, phenyl, lower alkoxyalkoxy, lower alkoxyalkyl, halogen, mercapto, hydroxy, phenoxy, phenylthio,

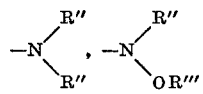

piperidino, lower alkylpiperidino, pyrrolidino, tetrahydrooxazino, lower alkyltetrahydrooxazino, piperazino and 4-R'''-piperazino; each R''' is individually selected from the group consisting of lower alkyl, cycloalkyl of 3–7 carbons, hydroxy lower alkyl, lower alkoxy lower alkyl, phenyl, phenyl lower alkyl, lower alkenyl and propargyl; and each R'' is individually selected from the group consisting of hydrogen and R'''; substituents, if any are present on said phenyl groups, being selected from the group consisting of halogen, lower alkoxy, lower alkyl and halogenated lower alkyl; and (b) pharmaceutically acceptable salts of (a).

2. The composition of claim 1 having between about 10 mg. and 250 mg. of active ingredient per dosage unit.

3. The composition of claim 2 in syrup form.

4. The composition of claim 2 in tablet form.

5. A method of producing tranquility in an animal comprising administering to said animal an effective tranquilizing amount of a member selected from the group consisting of (a) (N-monooxyamino)-s-triazine of the formula:

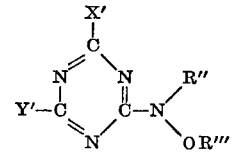

wherein X' and Y' are individually selected from the group consisting of hydrogen, lower alkyl, halogenated lower alkyl, phenyl lower alkyl, lower alkoxy, lower alkenyloxy, lower alkylmercapto, phenyl, lower alkoxyalkoxy, lower alkoxyalkyl, halogen, mercapto, hydroxy, phenoxy, phenylthio,

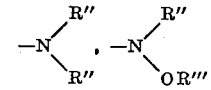

piperidino, lower alkylpiperidino, pyrrolidino, tetrahydrooxazino, lower alkyltetrahydrooxazino, piperazino, piperazino and 4-R'''-piperazino; each R''' is individually selected from the group consisting of lower alkyl, cycloalkyl of 3–7 carbons, hydroxy lower alkenyl and propargyl; and each R'' is individually selected from the group consisting of hydrogen and R'''; substituents, if any are present on said phenyl groups, being selected from the group consisting of halogen, lower alkoxy, lower alkyl and halogenated lower alkyl; and (b) pharmaceutically acceptable salts of (a).

References Cited
UNITED STATES PATENTS

| | | | |
|---|---|---|---|
| 2,368,451 | 1/1945 | D'Alelio | 260—249.8 |
| 2,508,323 | 5/1950 | Adams | 260—249.5 |
| 2,560,825 | 7/1951 | Schaefer | 260—249.5 |
| 2,854,379 | 9/1958 | Faucher | 167—65 |
| 3,086,910 | 4/1963 | Shetty et al. | 167—65 |
| 3,054,793 | 9/1962 | Howard et al. | 260—249.8X |
| 3,141,885 | 7/1964 | Ross et al. | 260—249.8 |
| 3,156,690 | 11/1964 | Dexter et al. | 260—249.8X |
| 3,244,713 | 4/1966 | Dowbenko et al. | 260—249.6X |
| 3,385,854 | 5/1968 | Knusli et al. | 260—249.9 |

FOREIGN PATENTS

| | | | |
|---|---|---|---|
| 819,520 | 9/1959 | Great Britain | 260—249.8 |
| 1,239,783 | 7/1960 | France | 260—249.8 |

OTHER REFERENCES

Ostrogovich et al.: Chemiches Zentralblatt, vol. 113 (1942), pp. 1879–81.

STANLEY J. FRIEDMAN, Primary Examiner